United States Patent [19]
Berbeco

[11] Patent Number: 4,645,717
[45] Date of Patent: Feb. 24, 1987

[54] SOLUTION FOR USE IN IMPREGNATING PAPER FOR HIGH-PRESSURE ANTISTATIC LAMINATES

[75] Inventor: George R. Berbeco, West Newton, Mass.

[73] Assignee: Charleswater Products, Inc., West Newton, Mass.

[21] Appl. No.: 825,576

[22] Filed: Feb. 4, 1986

Related U.S. Application Data

[60] Division of Ser. No. 602,552, Apr. 20, 1984, Pat. No. 4,589,954, which is a division of Ser. No. 460,860, Jan. 25, 1983, Pat. No. 4,454,199, which is a continuation-in-part of Ser. No. 422,277, Nov. 17, 1982, Pat. No. 4,455,350.

[51] Int. Cl.⁴ .................. B32B 27/08; B32B 27/42
[52] U.S. Cl. .................. 428/503; 252/500; 252/510; 252/511; 524/910; 524/911; 428/537.1
[58] Field of Search .............. 252/500, 511, 502, 510; 524/910, 911; 428/537.1, 503

[56] References Cited

U.S. PATENT DOCUMENTS

| | | | |
|---|---|---|---|
| 2,688,576 | 9/1954 | Ryan et al. | 252/511 X |
| 2,846,559 | 8/1958 | Rosenberg | 252/500 X |
| 2,993,022 | 7/1961 | Coler | 252/500 X |

FOREIGN PATENT DOCUMENTS

| | | | |
|---|---|---|---|
| 0012517 | 6/1980 | European Pat. Off. | 252/511 |
| 211421 | 7/1984 | German Democratic Rep. | 252/511 |
| 189160 | 10/1984 | Japan | 252/511 |
| 0730737 | 4/1980 | U.S.S.R. | 252/511 |

Primary Examiner—Nancy A. B. Swisher
Attorney, Agent, or Firm—Richard P. Crowley

[57] ABSTRACT

A treating solution for use in impregnating a paper sheet material useful in the preparation of electrically conductive high-pressure thermoset laminates, which treating solution comprises in combination: an aqueous resin solution which includes a heat-curable thermosetting formaldehyde-type resin; and, an electrically conductive amount of a quaternary ammonium compound sufficient to impart an electrical resistivity of about $10^{10}$ ohms per square inch or less to the impregnated thermoset paper sheet material.

13 Claims, 1 Drawing Figure

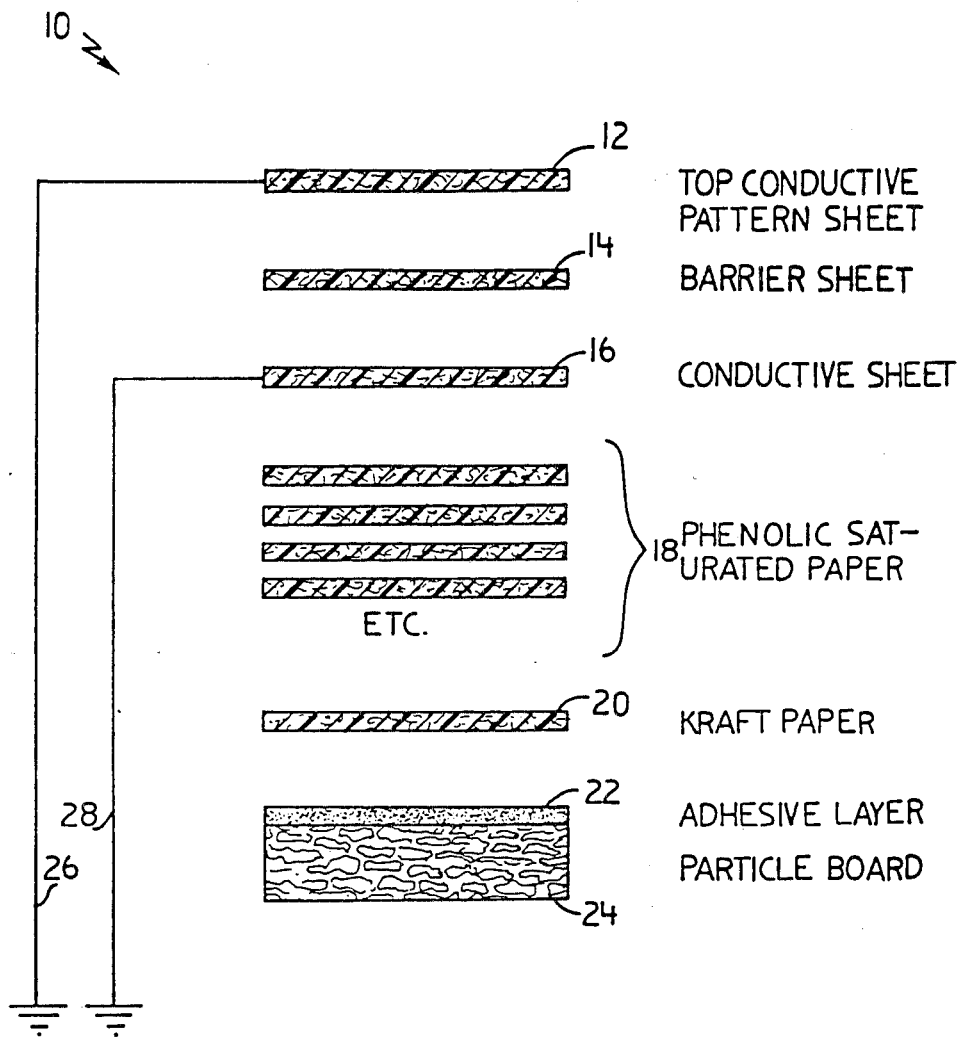

SOLUTION FOR USE IN IMPREGNATING PAPER FOR HIGH-PRESSURE ANTISTATIC LAMINATES

This is a divisional of co-pending application Ser. No. 602,552 filed on Apr. 20, 1984, now U.S. Pat. No. 4,589,954, which is a divisional of Ser. No. 460,860, filed Jan. 25, 1983, now U.S. Pat. No. 4,454,199, which is a continuation-in-part of Ser. No. 422,277, filed Nov. 17, 1982, now U.S. Pat. No. 4,455,350, issued June 19, 1984.

BACKGROUND OF THE INVENTION

Synthetic film and sheet materials of a conductive nature (approximately $10^9$ ohms per square surface resistivity or less; for example, 30,000 ohms) are desirable for use in environments where electronic components, discrete devices, electronic equipment, microprocessors, minicomputers, intelligent terminals, and any electronic equipment containing static-sensitive components may be subject to a static charge. Such charge may be generated by people or the environment, such as shipping, transporting, or otherwise moving such electronic components from place to place, utilizing the keyboard on a terminal, both in manufacture of electronic devices and equipment, and in transporting such devices and equipment and in other utilization of such electronic devices and equipment. In electronic manufacturing operations, production personnel utilize inexpensive synthetic materials for floor and work-surface coverings, such material being subject to rapid static-charge buildup and maintenance. Also in word-processing and data-processing areas, synthetic materials are used in floor coverings. In shipping electronic components and devices, the shipping-room and receiving-room personnel may generate static charges in normal course of business, which may be imparted, in handling, to electronic components or devices. In these environments, conductive sheet materials are utilized and provide a rapid circuit to ground for any static electrical charges that have been built up on tables, floors, and other surface areas.

A static-dissipating, synthetic sheet laminate material is described in U.S. Pat. No. 4,301,040, issued Nov. 17, 1981, wherein an electrically conductive layer composed of a polymeric film-forming binder material containing a static-reducing amount of electrically conductive particulate material is applied as a coating on the bottom surface of a sheet laminate material. While such back-coating of the sheet laminate material is effective to reduce static, it is desirable to provide an improved laminate sheet material having an improved conductive top surface, which laminate sheet material is easily and economically manufactured.

SUMMARY OF THE INVENTION

The invention relates to an improved conductive sheet material suitable for use as a surface covering and to the method of manufacturing and using such sheet materials. In particular, the invention concerns an improved conductive high-pressure sheet laminate material composed of a thermosetting polymeric sheet laminate material having an improved top surface resistivity of $10^9$ ohms per square inch or less, when tested in accordance with ASTM-D257, and to the method of manufacturing and using such laminate sheet material.

The sheet material of the invention comprises a synthetic sheet laminate material suitable for a surface covering, such as counter and table tops, having a hard, stain resistant, conductive, washable, synthetic top surface. Such laminate sheet material comprises a resin-impregnated, transparent or printed sheet which forms a top sheet material, which sheet material, either alone or with a plurality of underlying resin-impregnated sheets, provides for a semiconductive or static-dissipating top surface. In particular, the synthetic sheet laminate material of the invention comprises a plurality of resin-saturated, cured paper sheet materials, which include a conductive top sheet material, the sheet materials laminated together in a mold under heat and pressure, to form a hard, thermoset resin-laminate sheet material.

The sheet laminate comprises a top sheet material which contains an electrically conductive material, to improve the electrical conductivity and surface resistivity of the top of the sheet laminate material. The resin-saturated paper sheet material, composing the top sheet material, may be transparent or be a printed or pattern material, depending upon the decorative nature of the top surface. The sheet laminate has one or more top sheet materials, which include an electrically conductive amount of a quaternary ammonium compound such as a hydrocarbon, monomeric or polymeric, quaternary ammonium salt compound, so as to provide a surface resistivity of $10^9$ ohms per square inch or less, when tested in accordance with ASTM-D257, for example, such as a surface resistivity of less than $10^9$ ohms per square inch.

Optionally, the sheet laminate of the invention may comprise a resin-saturated barrier sheet disposed between one or more of the electrically conductive top surface sheets, and the remaining sheets in the sheet laminate, in order to provide a barrier to prevent migration of materials between the top sheets and the underlying sheets, or to provide a color or white background, when the top sheet is transparent. The sheet material may include a barrier sheet material which is typically a white or light-colored material, so as to provide a pleasing, decorative, transparent or colored top sheet material. The barrier sheet material prevents the migration of colored components, dark-colored resins or other materials of the underlying sheets from contaminating the top sheet material or changing or altering the color or appearance thereof.

Optionally, also the sheet laminate material of the invention may include an additional electrically conductive sheet material, typically a resin-impregnated fibrous sheet material impregnated with and containing an electrically conductive amount of an electrically conductive compound which may comprise, for example, a quaternary ammonium compound such as used in the top sheet material, or more particularly, may comprise electrically conductive particulate material, e.g. 5 to 80 percent by weight of the paper, such as carbon black or metallic particles, such as those materials, alone or in combination, with film-forming materials, as employed as a layer coating in U.S. Pat. No. 4,301,040, the disclosure of which is hereby incorporated by reference herein. The quaternary ammonium compounds useful in the top sheet may be used in combination with the metallic or carbon particle impregnated underlying paper sheet material. Where an underlying, electrically conductive sheet material is employed, for example, having carbon black as a particulate material, the barrier sheet is employed to prevent the dark-colored carbon material from contaminating the top surface or to protect the aesthetic or appearance effect of the top surface sheet material.

As in conventional formation of thermoset laminate sheet materials, an additional resin-impregnated paper sheet material may be employed as a bulking or a cushioning layer or to prevent telescoping of defects from the surface of the particle board to the top sheet material, and, therefore, the sheet material may comprise a plurality, such as two, three, four, five or more, thermoset, curable, resin-saturated sheet materials underlying one or more of the electrically conductive paper sheet materials. Typically, the additional sheet material comprises a phenolic resin-saturated paper sheet material.

In addition, the bottom of the sheet laminated material may include a kraft paper or heavy paper which may or may not be saturated with resin, and which serves as a bottom surface of the sheet material, so that the kraft paper may be secured through the use of an adhesive layer to the top surface of a particle board or other substrate. In use, the high-pressure sheet laminate material is secured to a solid particle board or other solid surface which serves as a counter or table top.

The sheet laminate of the invention may include one or more conductive top sheet materials and one or more electrically conductive sheet materials underneath the barrier sheet material. However, generally it is not desirable to employ an electrically conductive sheet material with carbon black as the top sheet material, since the top of the sheet laminate material then will be black and commercially undesirable in appearance. The top sheet material containing the quaternary ammonium compound for reducing static and enhancing conductivity on the top surface of the sheet laminate material, may include a variety of other materials and additives in the resin-saturated paper sheet; however, materials which would change the nature and the color of the top sheet generally are not used.

A wide variety of quaternary ammonium compounds are suitable for use in the top and other resin-containing fiberous sheets of the laminate of this invention. Such quaternary ammonium compounds include those compounds compatible with or soluble in the curable resin solutions and to impregnate and saturate the fibrous sheet materials used in the laminate. The quaternary ammonium compounds comprise those compounds containing one or more hydrocarbon groups on the nitrogen atom, such as methyl, benzyl, n-alkyl, alkylene, and alkoxylated groups and combinations thereof. The anionic group may vary typically is a acid salt group such as a halide-like chloride, acetate, or hydroxide groups.

One class of quaternary ammonium compounds includes the mono, di, or trialkyl like $C_1$–$C_4$ alkyl, for example, methyl and mono, di, or tri unsaturated hydrocarbon groups, for example, $C_3$–$C_2$ like allyl- or oleyl quaternary ammonium salt compounds. Such compounds would include but not be limited to: dimethyl diallyl, quaternary ammonium chloride: trimethyl allyl quaternary ammonium chloride; and other methyl-allyl quaternary ammonium salt compounds, as well as, the unsaturated long chain hydrocarbon quaternary ammonium compounds like the mono, and di unsaturated either short chain acrylic or fatty acid and alcohols, such as oleyldecyldimethyl quaternary ammonium chloride and other ethylenically unsaturated fatty-alkyl like methyl quaternary ammonium salt compounds.

Another class of quaternary ammonium compounds comprise the alkoxylated such as the ethoxylated-alkyl quaternary ammonium compounds wherein one or more groups are ethoxylated hydrocarbon such as ethoxylated quaternary methyl tri $C_8$–$C_{10}$ammonium chloride.

A further class includes the n-alkyl, methyl, benzyl quaternary ammonium halides like dimethyl dialkyl quaternary ammonium chloride, the dimethyl benzyl n-alkyl quaternary ammonium chlorides and other compounds wherein the n-alkyl group may be a saturated fatty acid or alcohol group. The quaternary ammonium compounds may include the monomer, prepolymer, or polymeric form of the quaternary ammonium compound. The compounds which are hydrophilic and are soluble in alcohol, for example, ethanol and water solutions, are preferred compounds.

The electrically conductive material employed in the top sheet material should be employed in an amount sufficient to provide for the desired resistivity of the top sheet, after the sheet laminate material is cured and presents a hard, washable top surface. Typically, such amounts may vary, but the amount employed should be sufficient to provide a surface resistivity of $10^9$ ohms per square inch, when tested by ASTM-D257, or less, such as $10^9$ ohms per square inch or less, and more particularly, for example, $10^8$ ohms per square inch of surface resistance or less. The amount of the quaternary ammonium material may vary and may range, for example, from about 5 to 50 percent by weight of the top conductive sheet containing the cured resin, such as, for example, from about over 10 percent and more particularly, 20 to 40 percent by weight. The quaternary ammonium compounds may be employed alone or in combination with other conductive material such as, glycols or with particulate material employed in the underlying electrically conductive resin-saturated sheet beneath the barrier sheet. The particulate material is typically carbon-black or metal particles, such as carbon-black having a particle size of less than 200, for example, 100 millimicrons, and typically from about 25 to 50 millimicrons, and having a nitrogen surface area ranging from about 100 to 2000 square meters per gram.

The curable thermoset resins employed to saturate the paper sheets may be a curable or cross-linkable resin or polymer, but generally are formaldehyde-type thermosetting resin compositions, such as a melamine-formaldehyde, urea-formaldehyde and phenol-formaldehyde and other methylol-type resins which are subject to curing under heat in the presence of a catalyst. In one embodiment, the top sheet materials, containing the quaternary ammonium compound may include a melamine-formaldehyde resin-saturated paper sheet, while the barrier sheet comprises a white or light-colored melamine-formaldehyde resin-saturated sheet, and the remaining sheets comprise phenol-formaldehyde resin-saturated sheets. Where an electrically conductive sheet employing particulate material is used, the sheet may comprise a melamine-formaldehyde resin-saturated paper sheet. The sheet materials employed in the preparation of the sheet laminate may comprise any fibrous sheet materials which can be saturated with, or can absorb, the curable resin solution, but more particularly are composed of fibrous paper sheet materials which contain and are impregnated with a curable resin, such as, from about 5 to 70 percent by weight; for example, 15 to 50 percent of the curable resin. The resin is heat-curable and the resin solution often includes a catalyst to accelerate the cure of the resin under the heat and pressure conditions employed in the mold in forming the sheet laminate.

The catalyst material used with the resin-saturated sheet materials of the laminate is employed in an amount sufficient to provide for curing fully the resin under the heat and pressure conditions used in preparing the sheet laminate material. Such catalyst may vary in an amount and composition and typically, for example, may comprise Lewis acid-type catalysts, particularly Lewis acid metal salt catalysts, such as aluminum trichloride, borontrifluoride or multivalent metallic salt halides or sulfates, such as magnesium chloride or zinc sulfate, and other catalysts employed in curing thermosetting resins.

The sheet materials of the prior art are typically very nonconductive, but are suitable for use as top surface sheet materials, where a clean room or washable surface is required. Such a hard surface material is commercially provided and sold as a laminate-type material having a hard, transparent, thermosetting resin and a washable, smooth top surface. The resin is impregnated into a series of porous, paper sheets laminated together under heat and pressure, so that the bottom surface presents a rough back surface, such as a kraft paper, which may or may not be impregnated with resin. The bottom surface of the kraft paper may be secured by adhesives or laminations, where resin-impregnated, to other sheets, and particularly to a particle board to make a laminate for a counter-top surface. The present invention provides for an improved electrically conductive top surface, so that such thermoset sheet laminate may be employed in those environments where a reduction of static charge is essential. The sheet material employed in preparing the sheet laminate may vary in thickness, but typically is paper, and may vary, for example, from 1 to 100 mils: for example, 2 to 20 mils, in thickness, while the kraft paper employed as the bottom layer of the laminate is thicker and may comprise up to 300 mils.

The electrically conductive sheet material, which optionally may be employed below one or more of the top sheet material and more particularly below the barrier sheet, may use carbon-black particles to enhance electrical conductivity, since color is not a feature of this sheet, or be similar to the top sheet. A dark-colored, carbon-black sheet which is resin-saturated and placed beneath the barrier sheet does not affect the appearance of the top surface of the sheet laminate of the invention. The use of this electrically conductive sheet or sheets provides for enhanced surface resistivity, alone or in combination with the top electrically conductive sheet material. The electrically conductive sheet is a fibrous sheet material, typically paper which is resin-saturated, so as to bond with and to form an integral portion of the cured laminate sheet material, and may include a film-forming polymeric binder material, for example, a SBR latex for the particular material used, and includes electrically conductive material, such as carbon-black or metallic particles. If desired, the electrically conductive sheet material may include the quaternary ammonium compounds alone or in combination with the particulate materials, to provide enhanced electrical conductivity.

The improved conductive sheet laminate material of the invention overcomes some of the disadvantages of the prior art and provides for enhanced surface conductivity, by incorporating the electrically conductive layer integrally within and as a top sheet of a thermoset sheet laminate material, while the electrically conductive back-coating composition of U.S. Pat. No. 4,301,040 optionally may be employed with an intermediate sheet in the laminate material of this invention.

The sheet laminate material is prepared by stacking the resin-saturated sheets in the desired pattern and position and, thereafter, placing the sheets in a mold where the sheets are subject to heat and pressure sufficient to form the thermoset formica-type laminate material. Typically, the temperature may range from 225° F. to 450° F. or more, such as 275° F. to 350° F., while the pressure may range from about 500 to 2500 psi or more; for example, 1000 to 1500 psi, over a time period, for example, of 5 minutes to 2 hours; for example, 15 minutes to 1 hour. After removal from the mold, the back surface of the sheet laminate so prepared is then secured to a surface, such as a particle board, through the use of an adhesive layer, such as polyvinyl acetate or other suitable adhesive material, to prepare an electrically counter top or table top surface.

In use electrically conductive lead wires are placed in the top electrically conductive layer, and where employed in the electrically conductive sheet beneath the barrier sheet and run to a ground path, so that any static charges accumulating on the top surface of the improved laminate sheet material may run to ground.

For the purpose of illustration only, the invention will be described in connection with certain embodiments; however, it is recognized that various changes, additions, modifications, and improvements may be made by those persons skilled in the art, all falling within the spirit and scope of the invention.

BRIEF DESCRIPTION OF THE DRAWING

The drawing is a schematic illustration of an exploded view of an electrically conductive sheet laminate material of the invention.

DESCRIPTION OF THE EMBODIMENTS

The drawing shows a sheet laminate material 10 of the invention as a counter top, the sheet material shown in an exploded view for the purpose of illustration, to include a melamine-formaldehyde, curable, resin-impregnated, top pattern sheet containing an electrically conductive amount of a quaternary ammonium salt compound therein, to impart electrical conductivity to the top sheet. The top sheet 12 comprises a heat curable resin-impregnated sheet. The conductive top pattern sheet is printed. A barrier sheet 14 is employed which is impregnated with a melamine-formaldehyde resin, the barrier sheet comprising a light-colored or white sheet top surface. When viewed through the cured transparent or translucent top sheet 12, the counter top is seen as a light-colored or white counter top.

An electrically conductive sheet material 16 is employed beneath the barrier sheet 14, the conductive sheet comprising a melamine-formaldehyde resin-impregnated paper sheet which includes dispersed therein finely-divided particulate carbon-black particles uniformly impregnating the paper sheet. The dark-colored carbon-particle-containing sheet may be employed without resin impregnation, with the sheet impregnated by the resin from the barrier sheet or from the underlying other sheets in the stack. However, in the preferred embodiment, all sheets that make up the sheet laminate are impregnated with curable resin. A plurality, such as from three to eight, of phenolic formaldehyde resin-saturated paper sheets 18, are used beneath the conductive sheet 16, to prevent the telescoping of defects in the particle-board surface 24 to the top sheet 12 and to provide bulk and rigidity to the sheet laminate. The number of phenolic resins saturated may vary as illustrated. The bottom sheet of the sheet laminate comprises a thick kraft paper 20, which may or may not be impregnated with a curable resin. As illustrated, the kraft paper 20 is impregnated with a resin. A particle board 24 is shown having an adhesive layer, such as polyvinyl acetate 22, on the surface thereof, so that, after the sheet laminate of the conductive sheets 12, 14, 16, 18 and 20 is placed in the mold and is formed into a rigid, thermoset, cured sheet material, that sheet material may be secured through an adhesive 22 to the surface of the particle board 24. As illustrated, electrical wires 26 and 28 lead, respectively, to the top conductive sheet 12 and to the conductive sheet 16, and provide an electrically conductive pathway to the ground for static charges accumulating on the laminate sheet material.

EXAMPLE 1

High pressure laminate sample (12"×12") was prepared by saturating, up to about a 50 percent weight gain, a pattern, top paper sheet and a conductive paper sheet material containing, and impregnated with, fine carbon-black particles with the resin solutions as shown in Table I. The resin-solution saturated paper was dried at 300° F. for ten minutes. The paper was placed on top (pattern sheet on top) of a phenolic-resin impregnated paper and formed into a high-pressure laminate sample, in a mold, by heating to 300° F. at a pressure of 1200 psi for 35 minutes. The sample laminates were soaked in isopropyl alcohol for ten minutes, dried, and then surface-conductivity-tested, in accordance with the results in Table I.

TABLE I

| FORMULATION | TOP SHEET RESIN TREATING SOLUTION WEIGHT IN GRAMS | | | |
|---|---|---|---|---|
| | 1 | 2 | 3 | 4 |
| 1. Heat curable melamine-formaldehyde aqueous resin solution | 200 | 200 | 200 | 200 |
| 2. Dimethyl diallyl ammonium chloride polymer (WT 40 CPS Chemical Co.) | 20 | 40 | | |
| 3. Dimethyl diallyl ammonium chloride (MDMDAC CPS Chemical Co.) | | | 20 | 40 |
| Surface resistivity ASTM-D257 (ohms/square) 100 volt input | $2 \times 10^9$ | $6 \times 10^6$ | $6 \times 10^{10}$ | $3 \times 10^9$ |

The resin treating solution generally has from about 10 to 25 parts of the quaternary ammonium compound per 100 parts of the resin solution, and from 0.1 to 25 parts; for example, 0.5 to 15 parts, per 100 parts of resin of a catalyst. An alcohol or other volatile organic solvent may be used for viscosity-adjusting and solubility purposes.

What is claimed is:

1. A impregnating solution for use in impregnating a paper sheet material useful in the preparation of high-pressure laminates to impart electrical conductivity to the paper sheet material, which solution comprises 100 parts by weight of a curable thermosetting formaldehyde-type resin and an effective amount of a catalyst, to effect curing of the resin under heat and pressure, and from about 10 to 90 parts by weight of alkyl-allyl quaternary ammonium compound, to impart electrical conductivity to the sheet material after treatment and drying.

2. The impregnating solution of claim 1 wherein the quaternary ammonium compound comprises a methyl allyl quaternary ammonium halide.

3. The impregnating solution of claim 1 wherein the curable thermosetting resin comprises a heat-curable melamine-formaldehyde resin, and wherein the catalyst comprises a Lewis acid catalyst.

4. A impregnating solution for use in impregnating a paper sheet material useful in the preparation of electrically conductive high-pressure thermoset laminates, which treating solution comprises in combination:
   (a) an aqueous resin solution which includes a heat-curable thermosetting formaldehyde-type resin which on heating provides for a cured thermoset resin, the heat-curable resin present in an amount to impregnate a paper sheet material for use in a high-pressure, thermoset laminate; and
   (b) an electrically conductive amount of a quaternary ammonium compound sufficient to impart an electrical resistivity of about $10^{10}$ ohms per square inch or less to the impregnated thermoset paper sheet material.

5. The solution of claim 4 wherein the formaldehyde-type resin comprises a heat-curable melamine-formaldehyde resin.

6. The solution of claim 4 which includes a resin-curing catalyst in an amount sufficient to provide for curing fully the resin under the heat and pressure conditions employed in preparing a thermoset laminate product.

7. The solution of claim 4 wherein the catalyst comprises from about 0.1 to 2.5 parts by weight of a Lewis acid catalyst per 100 parts by weight of the resin solution.

8. The solution of claim 4 wherein the quaternary ammonium compound comprises from about 10 to 25 parts by weight per 100 parts by weight of the resin solution.

9. The solution of claim 4 wherein the quaternary ammonium compound comprises a methyl-unsaturated hydrocarbon quaternary ammonium salt compound.

10. The solution of claim 4 wherein the quaternary ammonium compound comprises a methyl-allyl quaternary ammonium salt compound.

11. The solution of claim 4 wherein the quaternary ammonium compound comprises a dimethyl diallyl quaternary ammonium halide compound.

12. The solution of claim 4 which includes electrically conductive carbon particles dispersed therein.

13. A impregnating solution for use in impregnating a paper sheet material useful in the preparation of electrically conductive high-pressure thermoset laminates, which treating solution comprises in combination;

(a) 100 parts by weight of an aqueous heat-curable melamine-formaldehyde resin solution;
(b) a curing catalyst in an amount of from about 0.1 to 2.5 parts by weight to provide for the curing of the heat-curable resin; and
(c) a methyl-allyl quaternary ammonium compound in an amount of from about 10 to 25 parts by weight to impart electrical conductivity to the impregnated paper sheet material.

* * * * *